US011890256B2

(12) United States Patent
Syue et al.

(10) Patent No.: US 11,890,256 B2
(45) Date of Patent: Feb. 6, 2024

(54) ACTIVE ROLLATOR

(71) Applicant: Wistron Corporation, New Taipei (TW)

(72) Inventors: Ming-Ru Syue, New Taipei (TW); Cheng-Hsing Liu, New Taipei (TW); Jia-Hung Lee, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 688 days.

(21) Appl. No.: 16/952,188

(22) Filed: Nov. 19, 2020

(65) Prior Publication Data

US 2022/0096311 A1 Mar. 31, 2022

(30) Foreign Application Priority Data

Sep. 28, 2020 (TW) ................................ 109133726

(51) Int. Cl.
*A61H 3/04* (2006.01)

(52) U.S. Cl.
CPC ......... *A61H 3/04* (2013.01); *A61H 2003/043* (2013.01); *A61H 2003/046* (2013.01); *A61H 2201/1215* (2013.01); *A61H 2201/5064* (2013.01); *A61H 2201/5069* (2013.01); *A61H 2201/5079* (2013.01)

(58) Field of Classification Search
CPC .......................... A61H 3/04; A61H 2201/5064
See application file for complete search history.

(56) References Cited

U.S. PATENT DOCUMENTS

| | | | | |
|---|---|---|---|---|
| 7,826,983 | B2 * | 11/2010 | Alwan | B62B 5/0026 702/33 |
| 8,925,563 | B2 * | 1/2015 | Ota | B60L 50/52 135/85 |
| 2015/0359699 | A1 | 12/2015 | Chang et al. | |
| 2016/0106618 | A1 * | 4/2016 | Matsumoto | A61H 3/04 701/96 |
| 2016/0299502 | A1 | 10/2016 | Chamberlain et al. | |
| 2017/0273854 | A1 | 9/2017 | Yu | |
| 2019/0142684 | A1 * | 5/2019 | Liang | A61H 1/00 135/66 |
| 2020/0129366 | A1 | 4/2020 | Huang et al. | |

FOREIGN PATENT DOCUMENTS

| | | | |
|---|---|---|---|
| CN | 105283164 | A | 1/2016 |
| CN | 109223460 | A | 1/2019 |
| JP | 2001170119 | A | 6/2001 |
| JP | 2015223218 | A | 12/2015 |
| JP | 2017006580 | A | 1/2017 |
| JP | 2017035985 | A | 2/2017 |

OTHER PUBLICATIONS

Examination report dated Mar. 15, 2022, listed in related Japanese patent application No. 2020-194742.

* cited by examiner

*Primary Examiner* — Noah Chandler Hawk

(74) *Attorney, Agent, or Firm* — McClure, Qualey & Rodack, LLP

(57) ABSTRACT

An active rollator includes an auxiliary frame, a driving assembly, a sensing assembly, and a controller. The sensing assembly is configured to sense an operation area and output a sensing signal. When a user holds handlebars of the auxiliary frame and stands in the operation area, the controller is configured to, according to the sensing signal and a sensing threshold, control the driving assembly to make the auxiliary frame have a motion. Therefore, the active rollator aids the travel of the user.

17 Claims, 8 Drawing Sheets

ACTIVE ROLLATOR

CROSS-REFERENCE TO RELATED APPLICATION

This non-provisional application claims priority under 35 U.S.C. § 119(a) to Patent Application No. 109133726 filed in Taiwan, R.O.C. on Sep. 28, 2020, the entire contents of which are hereby incorporated by reference.

BACKGROUND

Technical Field

The present disclosure relates to a rollator, and in particular, to an active rollator.

Related Art

The elderly or disabled usually use aids to walk or move while alone. Conventional aids are crutches, wheelchairs, and wheeled walkers. People who are fairly healthy or require rehabilitation use wheeled walkers to walk or move. Some users use electric wheeled walkers to reduce the physical strength required to move or walk.

During the use of an electric wheeled walker, a user usually presses or holds a controller to control the wheeled walker to move. Such a control manner is inconvenient for users with relatively weak or incapable hands.

SUMMARY

In view of this, according to some embodiments, a rollator includes an auxiliary frame, a driving assembly, a sensing assembly, and a controller. The auxiliary frame includes a body and a bottom portion. The driving assembly is disposed at the bottom portion and is configured to make the auxiliary frame have a motion. The sensing assembly is disposed at the body and is configured to sense an operation area and output a sensing signal. The controller is configured to, according to the sensing signal and a sensing threshold, control the driving assembly to make the auxiliary frame have the motion corresponding to the sensing signal.

According to some embodiments, the sensing assembly includes a plurality of distance sensors. The sensing threshold includes a body distance area. Each distance sensor is configured to sense the operation area and output a distance signal. The distance sensors sense substantially different parts of the operation area. When the distance signals fall in the body distance area, the controller controls the driving assembly to drive the auxiliary frame to move in a traveling direction.

According to some embodiments, the sensing threshold includes a proximity area. A distance between the proximity area and the sensing assembly is substantially shorter than a distance between the body distance area and the sensing assembly. When one of the distance signals falls in the proximity area, the controller controls the driving assembly to drive the auxiliary frame to turn in a turning direction.

According to some embodiments, the controller obtains a traveling speed according to the distance signals. The controller controls the driving assembly to drive the auxiliary frame to move at the traveling speed in the traveling direction and drive the auxiliary frame according to the traveling speed to turn.

According to some embodiments, the sensing threshold includes a sideways range. When a maximum difference between the distance signals falls in the sideways range, the controller controls the driving assembly to drive the auxiliary frame to turn in a turning direction.

According to some embodiments, the sensing assembly includes a horizontal scanning sensor. The sensing threshold includes a traveling feature. The horizontal scanning sensor is configured to horizontally scan the operation area and output a horizontal scanning signal. When the horizontal scanning signal falls in the traveling feature, the controller controls the driving assembly to drive the auxiliary frame to move in a traveling direction.

According to some embodiments, the sensing threshold includes a turning feature. When the horizontal scanning signal falls in the turning feature, the controller controls the driving assembly to drive the auxiliary frame to turn in a turning direction.

According to some embodiments, the controller obtains a traveling speed according to the horizontal scanning signal, and controls the driving assembly to drive the auxiliary frame to move at the traveling speed in the traveling direction and drive the auxiliary frame according to the traveling speed to turn.

According to some embodiments, the sensing assembly includes a top sensor. The sensing threshold includes a top distance area. The top sensor is configured to sense a top area and output a top signal. When the top signal does not fall in the top distance area, the controller controls the driving assembly to stop the motion of the auxiliary frame.

According to some embodiments, the sensing assembly includes a vertical scanning sensor. The sensing threshold includes a tipping feature. The vertical scanning sensor is configured to vertically scan the operation area and output a vertical scanning signal. When the vertical scanning signal falls in the tipping feature, the controller controls the driving assembly to stop the motion of the auxiliary frame.

According to some embodiments, the active rollator further includes a gravity sensor. The gravity sensor is configured to sense an inclination angle of the active rollator. The controller adjusts a driving torque of the driving assembly according to the inclination angle.

According to some embodiments, the driving assembly includes two driving wheels, two driven wheels, two motors, and two driving circuits. The controller controls the driving circuits to enable the motors to separately drive the driving wheels to rotate and the rotating driving wheels enable the motion of the auxiliary frame.

In conclusion, according to some embodiments, the active rollator can sense a user's intention and generate a corresponding motion. In some embodiments, when a user is likely to tip, the active rollator can stop and provide support to the user.

DETAILED DESCRIPTION

Figure 1:
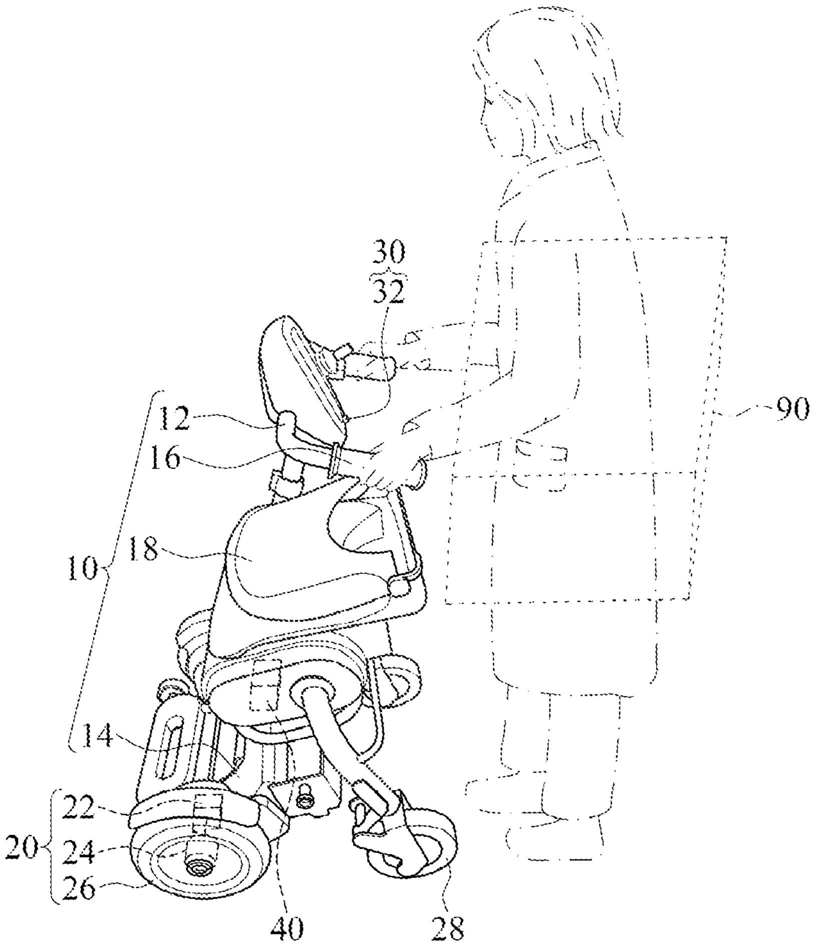
FIG. 1 illustrates a schematic diagram of the use state of an active rollator according to some embodiments.
Figure 2:
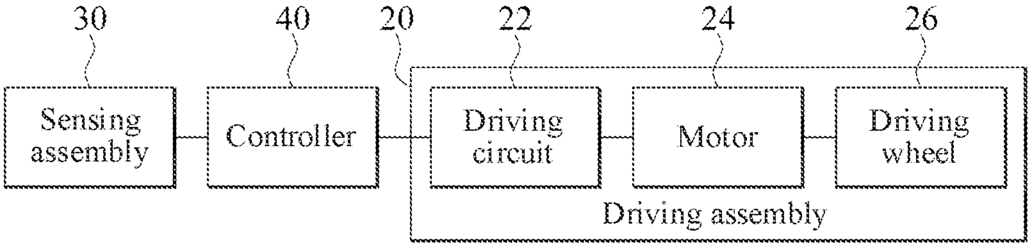
FIG. 2 illustrates a block diagram of the circuit of an active rollator according to some embodiments.

FIG. 1 illustrates a schematic diagram of the use state of an active rollator according to some embodiments. FIG. 2 illustrates a block diagram of the circuit of an active rollator according to some embodiments. An active rollator includes an auxiliary frame 10, a driving assembly 20, a sensing assembly 30, and a controller 40. The auxiliary frame 10 includes a body 12 and a bottom portion 14. The driving assembly 20 is disposed at the bottom portion 14 and is configured to enable a motion of the auxiliary frame 10. The sensing assembly 30 is disposed at the body 12 and is configured to sense an operation area 90 and output a sensing signal. The controller 40 is configured to, according to the sensing signal and a sensing threshold, control the driving assembly 20 to make the auxiliary frame 10 have the motion corresponding to the sensing signal.

The sensing assembly 30 is configured to sense an operation area 90 and output a corresponding sensing signal. When a user is not located at the operation area 90 and when the user is located at the operation area 90, sensing signals sent by the sensing assembly 30 for the two situations are different (details are described below). The controller 40 controls the driving assembly 20 according to the sensing signal and a sensing threshold (an example is given below) to drive the auxiliary frame 10 to generate the motion corresponding to the sensing signal. Specifically, the controller 40 determines whether the sensing signal falls in the sensing threshold to determine whether to control the driving assembly 20 to drive the auxiliary frame 10. For example, if the sensing signal does not fall in the sensing threshold, the controller 40 does not enable the driving assembly 20 to drive the auxiliary frame 10. Otherwise, if the sensing signal falls in the sensing threshold, the controller 40 controls the driving assembly 20 to drive the auxiliary frame 10. Therefore, when a user approaches and holds the auxiliary frame 10, the rollator starts to aid the travel of the user.

In some embodiments, the operation area 90 may be an area in which the user stands and holds the auxiliary frame 10 with ease. In some embodiments, the sensing threshold may be a distance area, and the distance area is located between a relatively far position and a relatively close position. The relatively far position is, for example, but not limited to, a position in which the user's hand cannot touch the auxiliary frame 10, and the relatively close position is, for example, but not limited to, a position in which the user is too close to the auxiliary frame 10 to hold the auxiliary frame 10 with ease. Therefore, the user can hold the auxiliary frame 10 when entering the operation area 90, and the rollator aids the travel of the user.

In some embodiments, after the controller 40 determines that the sensing signal falls in the sensing threshold for a predetermined time, the controller 40 controls the driving assembly 20 to drive the auxiliary frame 10. In this way, the user could hold the auxiliary frame 10 within the predetermined time after entering the operation area 90, and then the auxiliary frame 10 starts to have the motion and the user can travel with the aid of the rollator.

According to some embodiments, the active rollator may be a wheeled walker. That is, the rollator is provided with wheels. In some embodiments, the active rollator may be a walking-aid robot. That is, a motion mechanism (the driving assembly) of the rollator is a foot-type movement assembly, and the rollator has three, four or five feet. In some embodiments, the active rollator may be a walking-aid crawler. That is, the motion mechanism (the driving assembly) of the rollator is a crawler-type assembly.

In some embodiments, the auxiliary frame 10 of the active rollator includes a holding portion 16, and the holding portion 16 is, for example, but not limited to, a grip (as shown in FIG. 1) or a leaning portion (not shown in the figure). The user can lean against the leaning portion to travel with more ease. In some embodiments, the auxiliary frame 10 of the active rollator includes a seat 18, and the user may rest on the seat 18. In some embodiments, the auxiliary frame 10 includes a basket (not shown in the figure), and the basket is used for the user to place articles.

The driving assembly 20 is configured to receive the control of the controller 40 to enable the motion of the auxiliary frame 10. The motion is, for example, but not limited to, a movement or rotation. The movement is, for example, moving forward or moving backward. In some embodiments, the speed of the motion varies or remains unchanged as required (details are described below). In some embodiments, the rotation radius of the rotation may be adjusted or fixed as required (details are described below).

The sensing assembly 30 is disposed at the body 12. In some embodiments, the sensing assembly 30 is disposed at a position, corresponding to the waist, chest, belly or buttocks of the user, of the body 12. Therefore, when the user enters the operation area 90, the sensing assembly 30 senses the position of the corresponding waist, chest, belly or buttocks of the user.

The active rollator has different degrees of activeness according to different embodiments, which is described as follows.

Figure 3A:
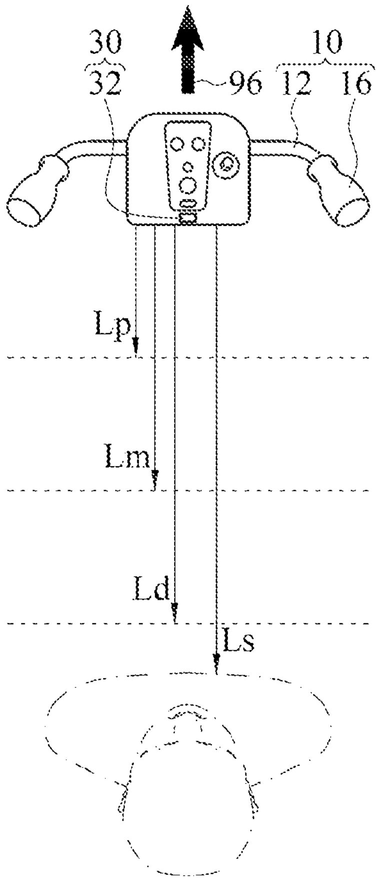
FIG. 3A, FIG. 3B, and FIG. 3C illustrate top views of the use state of an active rollator according to some embodiments.
Figure 3B:
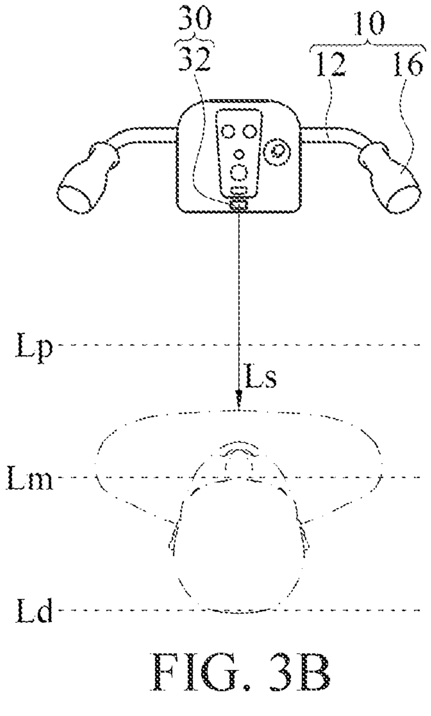
Figure 3C:
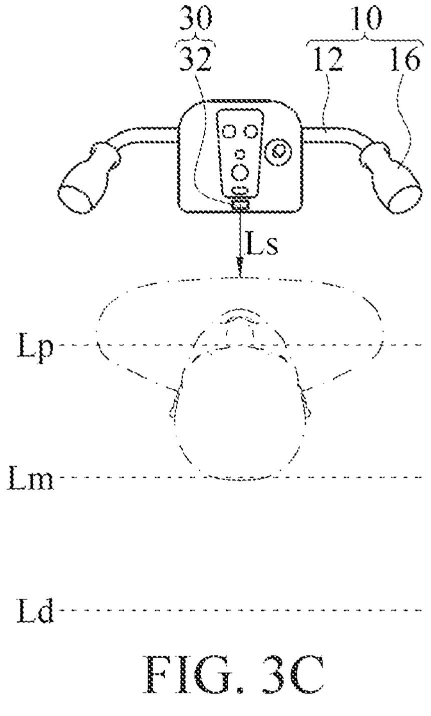

FIG. 3A, FIG. 3B, and FIG. 3C illustrate top views of the use state of an active rollator according to some embodiments (the drawings merely show an upper portion of the auxiliary frame 10). The sensing assembly 30 includes a distance sensor 32. The sensing threshold is a body distance area (or is referred to as a body activity space/zoom). The distance sensor 32 is configured to sense the operation area 90 and output a distance signal. When the distance signal falls in the body distance area, the controller 40 controls the driving assembly 20 to drive the auxiliary frame 10 to move in a traveling direction. In some embodiments, when the distance signal does not fall in the body distance area, the controller 40 controls the driving assembly 20 to stop the motion (in this case, stop the movement).

The body distance area corresponds to the size of the operation area 90. The embodiment shown in FIG. 3A is used as an example. The body distance area is the area between Ld and Lp (Ld may be referred to as a far end boundary, Lp may be referred to as a near end boundary, and the body distance area is the area between the far end boundary Ld and the near end boundary Lp). The distance sensor 32 senses the distance between the user and the distance sensor 32 as a distance signal Ls. Therefore, when the user does not enter the operation area 90, the distance signal Ls does not fall in the body distance area (as shown in FIG. 3A). When the user enters the operation area 90, the distance signal Ls falls in the body distance area (as shown in FIG. 3B). When the user is located relatively close to the distance sensor 32, the distance signal Ls does not fall in the body distance area (as shown in FIG. 3C).

Therefore, when the user is not close to the rollator, the distance sensor 32 cannot sense an object in the operation area 90. That is, the distance signal Ls does not fall in the body distance area. The distance between the user and the distance sensor 32 of the rollator is greater than the far end boundary Ld. That is, the distance signal Ls does not fall in the body distance area. In this case, the rollator performs no action. When the user enters the operation area and the distance signal Ls falls in the body distance area, the controller 40 controls the driving assembly 20 to drive the auxiliary frame 10 to move in a traveling direction (as shown by an upward arrow 96 in FIG. 3A). When the user remains in the operation area 90 (as shown in FIG. 3B), the rollator keeps moving in the traveling direction. When the traveling speed of the user is higher than the speed of the rollator for a period of time (that is, the user becomes increasingly close to the rollator), and the distance signal Ls is shorter than the near end boundary Lp. In this case, the controller 40 controls the driving assembly 20 to stop the motion. In this mode, when the user suddenly tips forward, the rollator provides support to the user to prevent the user from falling to the ground.

In some embodiments, the sensing threshold includes a middle distance Lm (as shown in FIG. 3A), and the middle distance Lm corresponds to a distance at which the user stands in the operation area 90 and holds the auxiliary frame 10 with ease. In some embodiments, the middle distance Lm is a middle area (that is, an area is obtained by increasing and reducing the middle distance by a predetermined size, and may also be referred to as a middle area). In this embodiment, when the distance signal Ls falls in the middle area, the controller 40 controls the driving assembly 20 to start to drive the auxiliary frame 10 to move in the traveling direction. In this embodiment, the user has a relatively sufficient preparation time. In some embodiments, the middle area falls within the body distance area (Lp, Ld).

The far end boundary Ld, the near end boundary Lp, the middle distance Lm, and the middle area may be set by the user as required. In some embodiments, the far end boundary Ld, the near end boundary Lp, the middle distance Lm, and the middle area are stored in a memory, and the memory may be a built-in memory or an external memory of the controller.

A movement speed of the rollator may be a preset value, set by the user, or varies according to the speed of the user. In some embodiments, when the user enters the far end boundary Ld, the controller 40 obtains a traveling speed according to the distance signal Ls and controls the driving assembly 20 to drive the auxiliary frame 10 to move at the traveling speed in the traveling direction. According to some embodiments, the controller 40 records a time at which the user enters the far end boundary Ld and a time at which the user reaches the middle distance Lm, to calculate the traveling speed of the user. In the calculation manner, the speed of the user may be obtained based on a time spent between the far end boundary Ld and the middle distance Lm. In some embodiments, the controller 40 divides the time at which the user enters the far end boundary Ld and the time at which the user reaches the middle distance Lm into a plurality of sub-time intervals, separately calculates sub-speeds of the sub-time intervals, and then selects a median or a mode of the sub-speeds as the traveling speed.

In some embodiments, the controller 40 dynamically adjusts a traveling speed at which the driving assembly 20 drives the auxiliary frame 10. Specifically, after controlling the driving assembly 20 to drive the auxiliary frame 10 to move at the traveling speed, the controller 40 continuously calculates a moving speed of the user to adjust a traveling speed at which the driving assembly 20 drives the auxiliary frame 10. For example, after the driving assembly 20 starts to drive the auxiliary frame 10 to move, the controller 40 recalculates the traveling speed of the user in a rolling correction manner. In the rolling correction manner, the controller 40 calculates a new traveling speed by combining some previous positions of the user and time data and a new position and time data. It should be noted that after the driving assembly 20 drives the auxiliary frame 10 to start to move, the speed calculated by the controller 40 according to the distance signal is a relative speed but not an absolute speed. Therefore, when the controller 40 is configured to control the traveling speed of the driving assembly 20, conversion is performed between the relative speed and the absolute speed.

In some embodiments, the speed control modes may be used together. For example, the rollator uses a preset value (a system preset value or a preset value of a user) at the beginning, and after the driving assembly 20 drives the rollator, the rollator is in the dynamically adjusted mode.

Referring to FIG. 1 and FIG. 2 again, in some embodiments, the rollator is a wheeled walker, and the driving assembly 20 includes a driving circuit 22, a motor 24, and a driving wheel 26. In the embodiment in FIG. 1, the driving assembly 20 includes two driving circuits 22, two motors 24, two driving wheels 26, and two driven wheels 28. The controller 40 controls the driving circuit 22, so that the driving circuit 22 drives the motor 24 to operate and the motor 24 makes the driving wheel 26 rotate. In this way, the driving wheel 26 drives a motion of the auxiliary frame 10 (the driving wheel 26 drives the auxiliary frame 10 for motion). For example, in FIG. 3A, the driving wheel 26 drives the auxiliary frame 10 to move in the traveling direction.

In some embodiments, the driving assembly 20 includes two independent driving wheels, and each independent driving wheel includes a driving circuit 22, a motor 24, and a driving wheel 26. The operation manner is not described herein again.

Figure 4A:
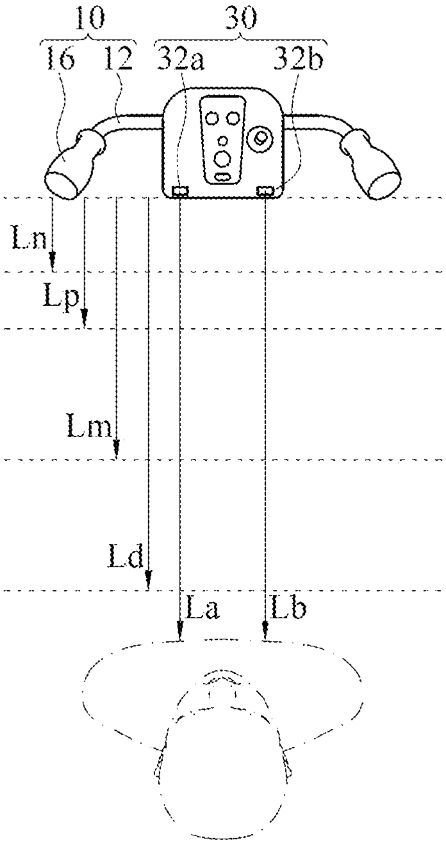
FIG. 4A, FIG. 4B, and FIG. 4C illustrate top views of the use state of an active rollator according to some embodiments.
Figure 4B:
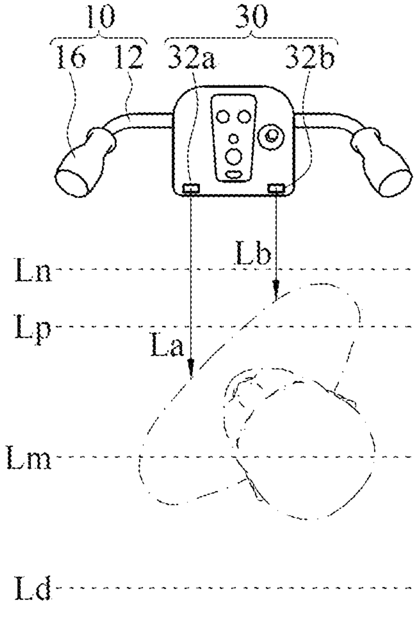
Figure 4C:
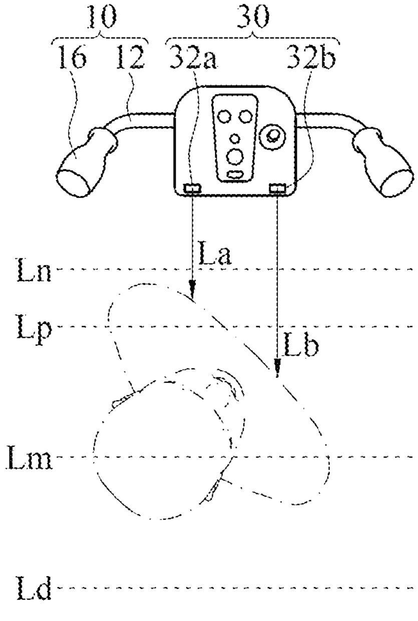

FIG. 4A, FIG. 4B, and FIG. 4C illustrate top views of the use state of an active rollator according to some embodiments. In this embodiment, the sensing assembly 30 includes a plurality of distance sensors 32*a* and 32*b*, the sensing threshold includes a body distance area (Ld, Lp), each of the distance sensors 32*a* and 32*b* is configured to sense the operation area 90 and output a distance signal La or Lb, the distance sensors 32*a* and 32*b* sense substantially different parts of the operation area 90, and when the distance signals La and Lb fall in the body distance area, the controller 40 controls the driving assembly 20 to drive the auxiliary frame 10 to move in a traveling direction.

In the embodiment shown in FIG. 4A, the two distance sensors 32*a* and 32*b* are used as an example. However, the present invention is not limited thereto. Three or four horizontally-arranged distance sensors may be alternatively arranged. The operation area 90 sensed by each of the distance sensors 32*a* and 32*b* is generally a tapered area with the tip facing the distance sensors 32*a* and 32*b* (not shown in the figure). Therefore, the distance sensors 32*a* and 32*b* sense substantially different parts of the operation area 90, and the substantially different parts means that the parts do not completely overlap. In this way, different positions of the user may be sensed.

In some embodiments, when the distance signals La and Lb are far away from the body distance area (that is, far away from the far end boundary Ld), the controller 40 controls the driving assembly 20 to stop the motion. When the distance signals La and Lb both fall in the body distance area, the controller 40 controls the driving assembly 20 to drive the auxiliary frame 10 to move in the traveling direction. In some embodiments, a manner in which the controller 40 determines the distance signals La and Lb, the middle distance Lm, and the middle area is similar to that in the previously described embodiments of FIG. 3A, FIG. 3B, and FIG. 3C, and details are not described in detail again.

When one of the distance signals La and Lb falls in the body distance area and the other of the distance signals La and Lb is far away from the far end boundary Ld, the controller 40 maintains an original motion state of the rollator if the rollator is in a motion state.

When one of the distance signals La and Lb falls in the body distance area and the other of the distance signals La and Lb is far away from the far end boundary Ld, the controller 40 temporarily does not control the driving assembly 20 to drive the auxiliary frame 10 to move if the rollator is in a stationary state. Next, if the distance signals La and Lb both fall in the body distance area, the starting point at which the controller 40 controls the driving assembly 20 to drive the auxiliary frame 10 to move has the following modes: (1) the distance signals La and Lb both fall in the body distance area, (2) the distance signals La and Lb both fall in the body distance area for a predetermined time, (3) one of the distance signals La and Lb falls in the middle area, or (4) the distance signals La and Lb both fall in the middle area. However, the present invention is not limited thereto.

In some embodiments, the sensing threshold includes a proximity area (Ln, Lp, or may be referred to as a proximity interval, Ln may be referred to as a proximity boundary), the distance between the proximity area (Ln, Lp) and the sensing assembly 30 is substantially shorter than the distance between the body distance area (Lp, Ld) and the sensing assembly 30, and when one of the distance signals La and Lb falls in the proximity area (Ln, Lp) (as shown in FIG. 4B and FIG. 4C), the controller 40 controls the driving assembly 20 to drive the auxiliary frame 10 to turn in a turning direction.

In some embodiments, "the distance between the proximity area (Ln, Lp) and the sensing assembly 30 is substantially shorter than the distance between the body distance area (Lp, Ld) and the sensing assembly 30" is that the proximity area (Ln, Lp) and the body distance area (Lp, Ld) partially overlap, or boundaries of the proximity area and the body distance area are adjacent (as shown in FIG. 4A, Lp is an adjacent boundary between the proximity area and the body distance area).

When one of the distance signals La and Lb falls in the proximity area (Ln, Lp) (as shown in FIG. 4B and FIG. 4C), the controller 40 controls the driving assembly 20 to drive the auxiliary frame 10 to turn in a turning direction, and the turning direction corresponds to the distance signals La and Lb. In some embodiments, the turning direction corresponds to a longer one of the distance signals La and Lb. That is, for example, in FIG. 4B, the controller 40 controls the driving assembly 20 to turn left. For example, in FIG. 4C, the controller 40 controls the driving assembly 20 to turn right.

A manner in which the controller 40 controls the driving assembly 20 to turn right is that for example, two front wheels in FIG. 1 are the driving wheels 26, and the controller 40 controls the right driving wheel 26 to be stationary and the left driving wheel 26 to rotate. In this way, the driving assembly may rotate by using the right driving wheel 26 as the center. In some embodiments, the controller 40 controls the rotation speed of the right driving wheel 26 to be lower than the rotation speed of the left driving wheel 26. In this way, the driving assembly may turn right with a relatively large rotation radius.

In some embodiments, the driving assembly 20 includes two driving circuits 22, two motors 24, two driving wheels 26, two driven wheels 28, and two steering mechanisms (not shown in the figure). The controller 40 controls the steering mechanisms to steer to turn right or left.

In some embodiments, the driving assembly 20 is a three-wheel assembly. Specifically, the driving assembly 20 includes a driving circuit 22, a motor 24, a steering mechanism (not shown in the figure), a driving wheel 26, and two driven wheels 28. The controller 40 controls the steering mechanisms to steer to turn right or left.

In some embodiments, when the distance signals La and Lb both fall in the proximity area (Ln, Lp), the controller 40 controls the driving assembly 20 to stop a motion of the rollator. In some embodiments, when one of the distance signals La and Lb falls in the proximity area (Ln, Lp) and the other of the distance signals La and Lb is greater than the far end boundary Ld (greater than the body distance area), the controller 40 controls the driving assembly 20 to stop the motion of the rollator.

In some embodiments, the controller 40 obtains a traveling speed according to the distance signals La and Lb, and the controller 40 controls the driving assembly 20 to drive the auxiliary frame 10 to move at the traveling speed in the traveling direction and drive the auxiliary frame 10 according to the traveling speed to turn.

A manner in which the controller 40 obtains the traveling speed according to the distance signals La and Lb may be "the manner of obtaining the traveling speed according to the distance signal Ls in FIG. 3A", in which traveling speeds of La and Lb are separately obtained and are averaged, or the traveling speed is directly obtained according to an average value of the distance signals La and Lb in "the manner of obtaining the traveling speed according to the distance signal Ls in FIG. 3A".

A manner in which the controller 40 controls the auxiliary frame 10 according to the traveling speed to turn may be that the controller 40 may control the driving assembly 20 at a speed same as the traveling speed to drive the auxiliary frame 10 according to the traveling speed to turn. In some embodiments, the controller 40 may control the driving assembly 20 at a speed that is a predetermined multiple of the traveling speed to drive the auxiliary frame 10 according to the traveling speed to turn, and the predetermined multiple may be 0.6 to 1.2, depending on the speed required for the turning.

Referring to FIG. 4A, FIG. 4B, and FIG. 4C again, in some embodiments, the sensing threshold includes a sideways range, and when a maximum difference between the distance signals La and Lb falls in the sideways range, the controller 40 controls the driving assembly 20 to drive the auxiliary frame 10 to turn in a turning direction.

In some embodiments, the sideways range is 20 cm to 40 cm, and the maximum difference between the distance signals La and Lb is the absolute value of La−Lb. When the difference falls in the sideways range, it indicates that the user wants to turn. Therefore, the controller 40 controls the driving assembly 20 to drive the auxiliary frame 10 to turn in a direction of the larger one of the distance signals. In some embodiments, the sensing assembly 30 includes three or more distance sensor 32*a* and 32*b*. In this case, it may be learned, by determining whether a maximum difference between the distance signals La and Lb falls in the sideways range, whether the user intends to turn, and the controller further actively performs corresponding control.

Figure 5:
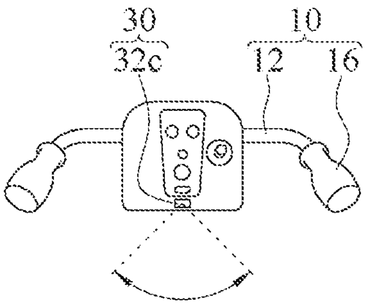
FIG. 5 illustrates a top view of an active rollator according to some embodiments.
Figure 6A:
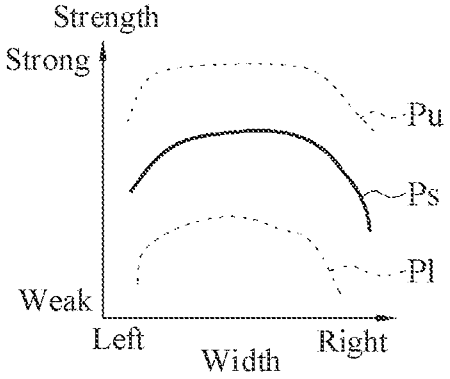
FIG. 6A illustrates a schematic diagram of a traveling feature according to some embodiments.

Refer to FIG. 5 in combination with FIG. 6A. FIG. 5 illustrates a top view of an active rollator according to some embodiments. FIG. 6A is a schematic diagram of a traveling feature according to some embodiments. In this embodiment, the sensing assembly 30 includes a horizontal scanning sensor 32*c*, the sensing threshold includes a traveling feature (Pu, Pl), the horizontal scanning sensor 32*c* is configured to horizontally scan the operation area 90 and output a horizontal scanning signal Ps, and when the horizontal scanning signal Ps falls in the traveling feature (Pu, Pl), the controller 40 controls the driving assembly 20 to drive the auxiliary frame 10 to move in a traveling direction. In some embodiments, the horizontal scanning sensor 32*c* is a scanning distance sensor. The levelness of horizontal scanning of the horizontal scanning sensor 32*c* is not required to be level with the ground. During implementation, the horizontal scanning signal Ps horizontally scanned by the horizontal scanning sensor 32*c* can correspond to the traveling feature (Pu, Pl), and the controller 40 could accurately perform determination.

The horizontal axis in FIG. 6A is the width of horizontal scanning of the horizontal scanning sensor 32*c*. In some embodiments, the traveling feature includes an upper limit feature Pu and a lower limit feature Pl, and the traveling feature (Pu, Pl) corresponds to the operation area 90. When the horizontal scanning signal Ps falls in the traveling feature (Pu, Pl), the controller 40 controls the driving assembly 20 to drive the auxiliary frame 10 to move in a traveling direction.

Figure 6B:
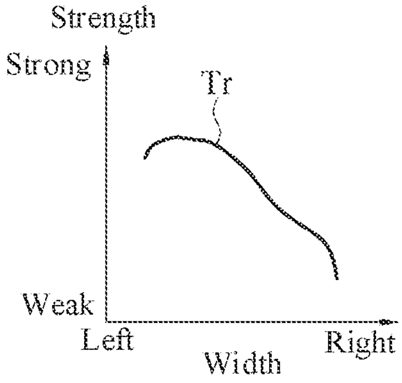
FIG. 6B and FIG. 6C illustrate schematic diagrams of a turning feature according to some embodiments.
Figure 6C:
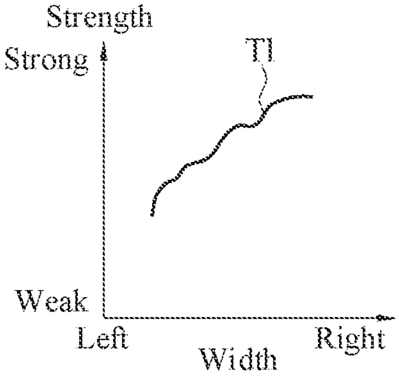

FIG. 6B and FIG. 6C illustrate schematic diagrams of a turning feature according to some embodiments. The sensing threshold includes a turning feature, and when the horizontal scanning signal Ps falls in the turning feature, the controller 40 controls the driving assembly 20 to drive the auxiliary frame 10 to turn in a turning direction. In some embodiments, the turning feature includes a right-turning feature Tr and a left-turning feature Tl. Therefore, when the horizontal scanning signal Ps falls in the right-turning feature Tr or the left-turning feature Tl, it indicates that the user is facing sideways and intends to turn, the controller 40 controls the driving assembly 20 to drive the auxiliary frame 10 to turn in a corresponding turning direction. In some embodiments, when determining whether the horizontal scanning signal Ps falls in the right-turning feature Tr or the left-turning feature Tl, the controller 40 performs determination according to a right-turning feature range or a left-turning feature range, to better determine an intention of the user. In some embodiments, the right-turning feature range is obtained by increasing and reducing the right-turning feature by a margin value, the left-turning feature range is obtained by increasing and reducing the left-turning feature by a margin value, and the margin values of the left-turning feature range and the right-turning feature range may be the same or different.

Figure 7A:
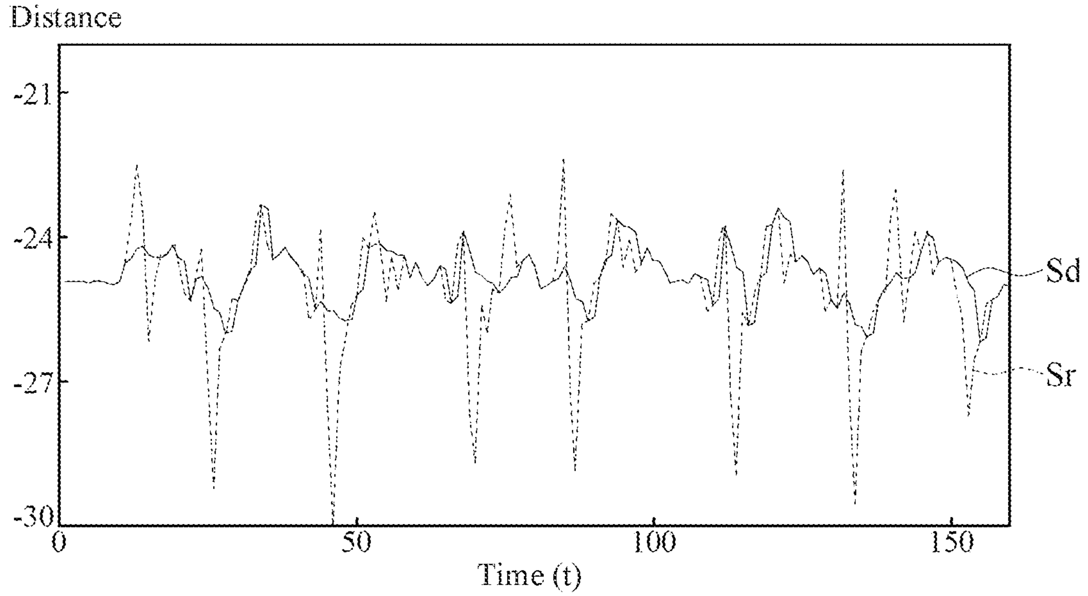
FIG. 7A illustrates a schematic diagram of de-outlier processing of a horizontal scanning signal according to some embodiments.

The horizontal scanning sensor 32*c* may be a package assembly of a scanning sensor, that is, a horizontal scanning signal Ps outputted by the scanning sensor has been processed without noise, and may be used directly by the controller 40. In some embodiments, an output signal of the horizontal scanning sensor 32*c* is a raw signal. In this case, the controller 40 performs noise filtering on the raw signal. FIG. 7A illustrates a schematic diagram of de-outlier processing of a horizontal scanning signal according to some embodiments. The horizontal axis in the figure is time, and the vertical axis is distance. It may be learned from the figure that a fluctuation amplitude (an outlier) of a raw signal Sr is considerably large, and an outlier of a de-outlier signal Sd obtained after de-outlier processing obviously decreases.

Figure 7B:
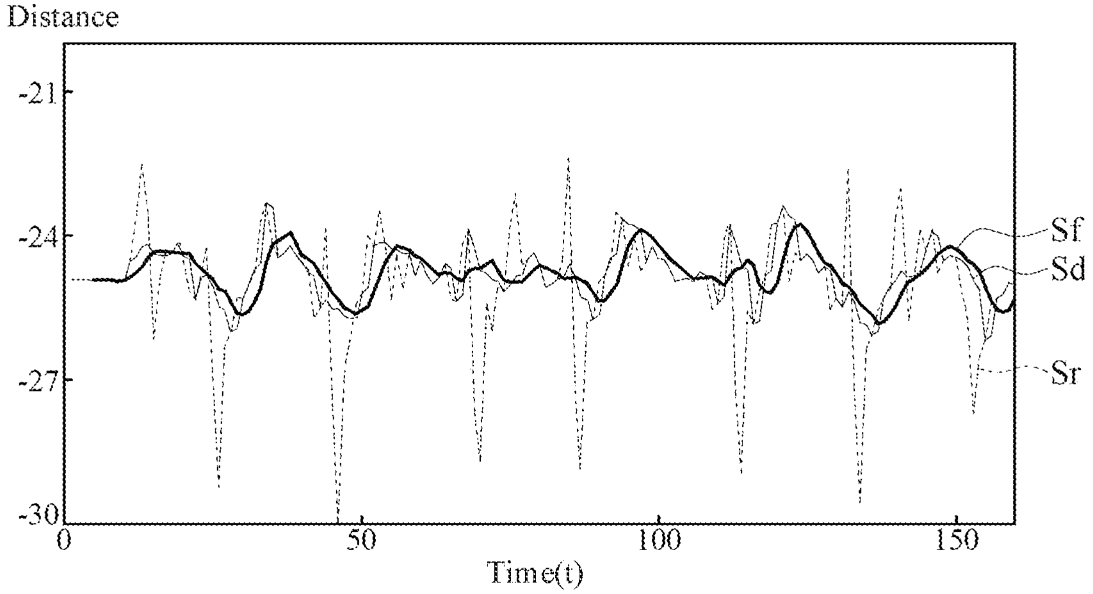
FIG. 7B illustrates a schematic diagram of filtering processing of a horizontal scanning signal according to some embodiments.

FIG. 7B illustrates a schematic diagram of filtering processing of a horizontal scanning signal according to some embodiments. It may be learned from the figure that a filtered signal Sf obtained after filtering processing is smoother. Next, the controller 40 performs determination according to the filtered signal Sf and can determine the intention of the user more accurately and perform a correct corresponding action.

In some embodiments, the controller 40 obtains a traveling speed according to the horizontal scanning signal Ps, and controls the driving assembly 20 to drive the auxiliary frame 10 to move at the traveling speed in the traveling direction and drive the auxiliary frame 10 according to the traveling speed to turn. The calculation in this part is similar to that described above, and therefore the description thereof is omitted.

Figure 8A:
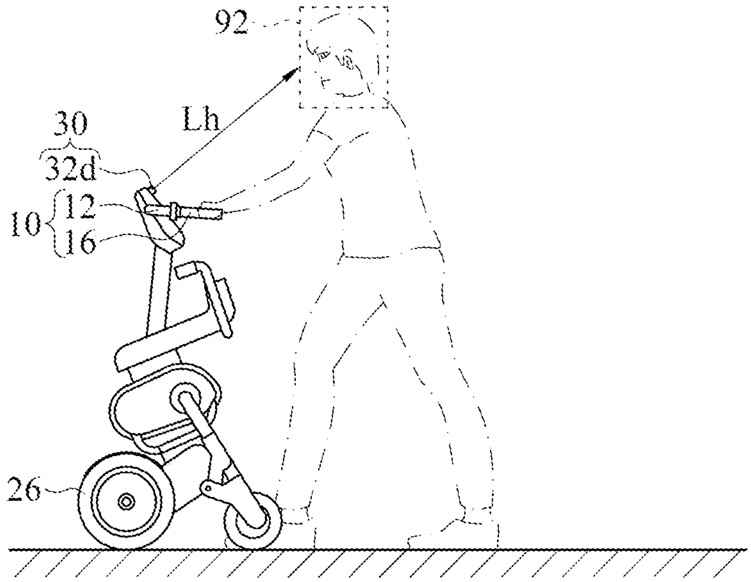
FIG. 8A and FIG. 8B illustrate side views of an active rollator according to some embodiments.
Figure 8B:
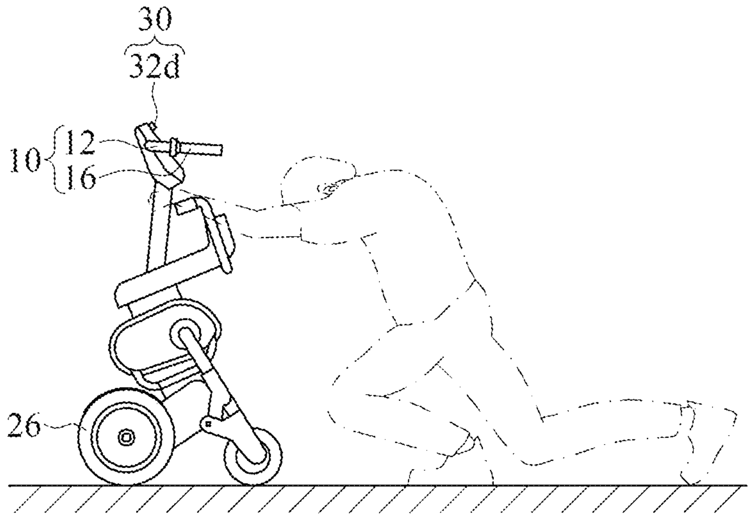

FIG. 8A and FIG. 8B illustrate side views of an active rollator according to some embodiments. In some embodiments, the sensing assembly 30 includes a top sensor 32*d*, the sensing threshold includes a top distance area, the top sensor 32*d* is configured to sense a top area 92 and output a top signal Lh, and when the top signal Lh does not fall in the top distance area, the controller 40 controls the driving assembly 20 to stop the motion of the auxiliary frame 10. In some embodiments, the top distance area corresponds to the top area 92. The top distance area includes an upper limit distance and a lower limit distance, which are similar to those described above. Details are not described again. In some embodiment, the top area 92 is above the operation area 90 or overlaps with the operation area 90. In some embodiments, the top area 92 corresponds to head, neck or shoulder of predetermined users. The top sensor 32*d* sense the distance between the top sensor 32*d* and In this embodiment, when the user normally uses the rollator, the top signal Lh falls in the top distance area, and when the user tips backward or leans forward (as shown in FIG. 8B), the top signal Lh does not fall in the top distance area. In this case, when the top signal Lh does not fall in the top distance area, the controller 40 controls the driving assembly 20 to stop the motion of the auxiliary frame 10, to provide support to the user and ensure the safety of the user.

Figure 9:
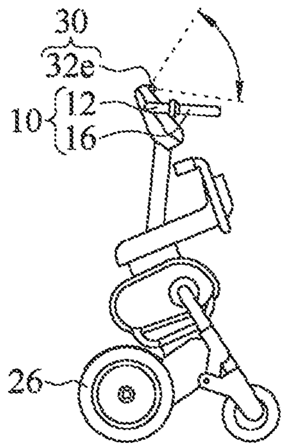
FIG. 9 illustrates a side view of an active rollator according to some embodiments.
Figure 10A:
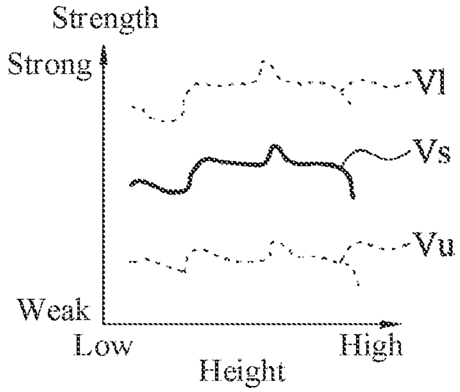
FIG. 10A illustrates a schematic diagram of a vertical scanning signal according to some embodiments.
Figure 10B:
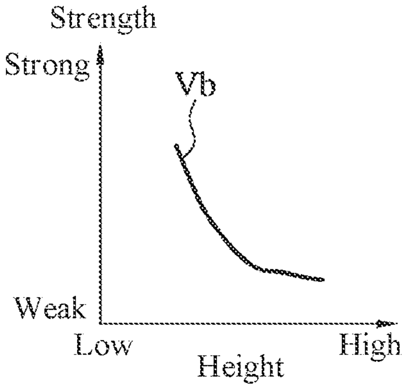
FIG. 10B and FIG. 10C illustrate schematic diagrams of a tipping feature according to some embodiments.
Figure 10C:
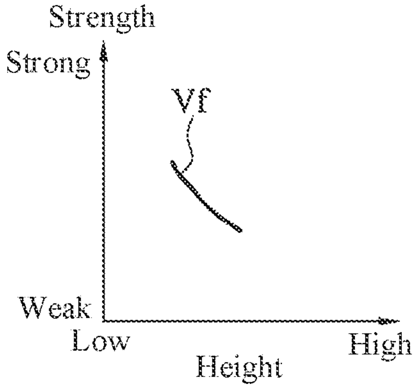

Refer to FIG. 9 in combination with FIG. 10A, FIG. 10B, and FIG. 10C. FIG. 9 illustrates a side view of an active rollator according to some embodiments. FIG. 10A is a schematic diagram of a vertical scanning signal according to some embodiments. FIG. 10B and FIG. 10C illustrate schematic diagrams of a tipping feature according to some embodiments. In some embodiments, the sensing assembly 30 includes a vertical scanning sensor 32*e*, the sensing threshold includes a plurality of tipping features (Vb, Vf), and the vertical scanning sensor 32*e* is configured to vertically scan the operation area 90 and output a vertical scanning signal Vs. When the vertical scanning signal Vs falls in one of the tipping features (Vb, Vf), the controller 40 controls the driving assembly 20 to stop the motion of the auxiliary frame 10. The tipping feature Vb shown in FIG. 10B may correspond to a case that the user leans backward, and the tipping feature Vf shown in FIG. 10C may correspond to a case that the user tips forward or collapses. In some embodiments, the vertical scanning signal Vs should fall between an upper limit feature Vu and a lower limit feature Vl. In this case, the controller 40 determines that the user is in a normal state.

Figure 11:
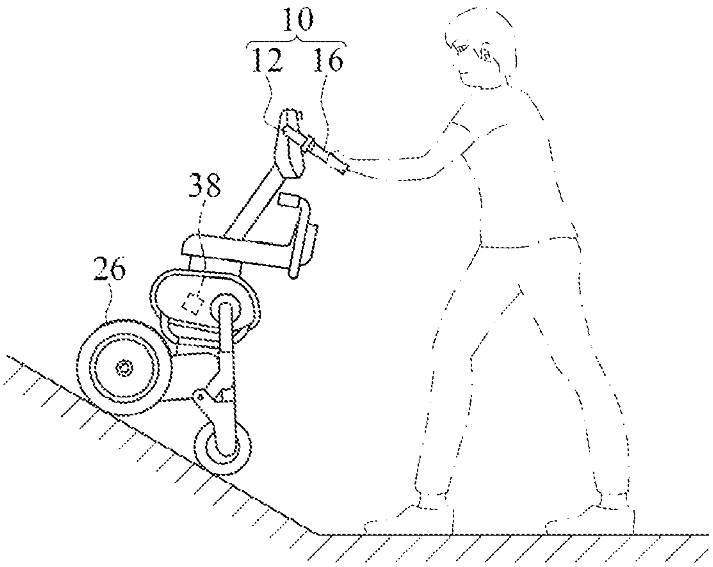
FIG. 11 illustrates a side view of an active rollator according to some embodiments.

FIG. 11 illustrates a side view of an active rollator according to some embodiments. The active rollator further includes a gravity sensor 38, and the gravity sensor 38 is configured to sense an inclination angle of the rollator. When the inclination angle falls in a tilt range (the tilt range may be between an upper limit tilt and a lower limit tilt), the controller 40 adjusts a driving torque of the driving assembly 20 according to the inclination angle. When the active rollator is driven to make a motion on a road, the gravity sensor 38 is configured to sense an inclination angle of the road. In some embodiments, the gravity sensor 38 is disposed at the auxiliary frame 10 and is located at a stationary position relative to the driving wheel 26 or the driven wheel 28, so that when the rollator moves, the gravity sensor senses an inclination angle of a road. In some embodiments, the inclination angle includes an upward tilt and a downward tilt. When the inclination angle is the upward tilt, the controller 40 increases the driving torque of the driving assembly 20. When the inclination angle is the downward tilt, the controller 40 controls the driving torque of the driving assembly 20 to make the auxiliary frame 10 maintain a stable speed. In some embodiments, a driving torque adjustment value is directly proportional to the inclination angle. In some embodiments, when the inclination angle is less than a predetermined tilt (the predetermined tilt may be the lower limit tilt of the tilt range), the controller 40 does not adjust the driving torque of the driving assembly 20. In some embodiments, when controlling the driving assembly 20 to drive the auxiliary frame 10 to move, the controller 40 adjusts the driving torque of the driving assembly 20 according to the inclination angle. That is, when the active rollator is in a stop state or in a transported state, the controller 40 does not adjust the driving torque of the driving assembly 20 according to the inclination angle.

In conclusion, in some embodiments, the active rollator can sense a user's intention and generate a corresponding motion. In some embodiments, when a user is likely to tip, the active rollator can stop and provide support to the user.

What is claimed is:

1. An active rollator, comprising:

an auxiliary frame, comprising a body and a bottom portion;

a driving assembly, disposed at the bottom portion and configured to make the auxiliary frame have a motion;

a sensing assembly, disposed at the body and configured to sense an operation area and output a sensing signal; and a controller, configured to, according to the sensing signal and a sensing threshold, control the driving assembly to make the auxiliary frame have the motion corresponding to the sensing signal; wherein the sensing assembly comprises two distance sensors, the sensing threshold comprises a body distance area and a middle area, the middle area is in the body distance area, each distance sensor is configured to sense the operation area and output a distance signal, the distance sensors sense substantially different parts of the operation area; when the distance signals fall in the middle area, the controller controls the driving assembly to drive the auxiliary frame to move in a traveling direction; and when the distance signals fall in the body distance area, the controller controls the driving assembly to maintain the movement of the auxiliary frame.

2. The active rollator according to claim 1, wherein when the distance signals do not fall in the body distance area, the controller controls the driving assembly to stop the movement;

the sensing threshold comprises a proximity area, a distance between the proximity area and the sensing assembly is substantially shorter than a distance between the body distance area and the sensing assembly, and when one of the distance signals falls in the proximity area, the controller controls the driving assembly to drive the auxiliary frame to turn in a turning direction;

the controller obtains a traveling speed according to the distance signals, and the controller controls the driving assembly to drive the auxiliary frame to move at the traveling speed in the traveling direction and drive the auxiliary frame according to the traveling speed to turn; and the sensing assembly comprises a top sensor, the sensing threshold comprises a top distance area, the top sensor is configured to sense a top area and output a top signal, and when the top signal does not fall in the top distance area, the controller controls the driving assembly to stop the motion of the auxiliary frame.

3. The active rollator according to claim 1, wherein when the distance signals do not fall in the body distance area, the controller controls the driving assembly to stop the movement;

the sensing threshold comprises a sideways range, and when a difference between the two distance signals falls in the sideways range, the controller controls the driving assembly to drive the auxiliary frame to turn in a turning direction;

the controller obtains a traveling speed according to the distance signals, and the controller controls the driving assembly to drive the auxiliary frame to move at the traveling speed in the traveling direction and drive the auxiliary frame according to the traveling speed to turn; and the sensing assembly comprises a top sensor, the sensing threshold comprises a top distance area, the top sensor is configured to sense a top area and output a top signal, and when the top signal does not fall in the top distance area, the controller controls the driving assembly to stop the motion of the auxiliary frame.

4. The active rollator according to claim 3, further comprising a gravity sensor, wherein the gravity sensor is configured to sense an inclination angle of the active rollator, and when the inclination angle falls in a tilt range, the controller adjusts a driving torque of the driving assembly.

5. The active rollator according to claim 4, wherein the driving assembly comprises a driving wheel, two driven wheels, a motor, and a driving circuit, and the controller controls the driving circuit to make the motor to drive the driving wheel to rotate and the rotating driving wheel enables the motion of the auxiliary frame.

6. An active rollator, comprising:

an auxiliary frame, comprising a body and a bottom portion;

a driving assembly, disposed at the bottom portion and configured to make the auxiliary frame have a motion;

a sensing assembly, disposed at the body and configured to sense an operation area and output a sensing signal; and a controller, configured to, according to the sensing signal and a sensing threshold, control the driving assembly to make the auxiliary frame have the motion corresponding to the sensing signal, wherein the sensing assembly comprises a plurality of distance sensors, the sensing threshold comprises a body distance area, each distance sensor is configured to sense the operation area and output a distance signal, the distance sensors sense substantially different parts of the operation area, and when the distance signals fall in the body distance area, the controller controls the driving assembly to drive the auxiliary frame to move in a traveling direction.

7. The active rollator according to claim 6, wherein the sensing threshold comprises a proximity area, a distance between the proximity area and the sensing assembly is substantially shorter than a distance between the body distance area and the sensing assembly, and when one of the distance signals falls in the proximity area, the controller controls the driving assembly to drive the auxiliary frame to turn in a turning direction.

8. The active rollator according to claim 7, wherein the controller obtains a traveling speed according to the distance signals, and the controller controls the driving assembly to drive the auxiliary frame to move at the traveling speed in the traveling direction and drive the auxiliary frame according to the traveling speed to turn.

9. The active rollator according to claim 6, wherein the sensing threshold comprises a sideways range, and when a maximum difference among the distance signals falls in the sideways range, the controller controls the driving assembly to drive the auxiliary frame to turn in a turning direction.

10. An active rollator, comprising:

an auxiliary frame, comprising a body and a bottom portion;

a driving assembly, disposed at the bottom portion and configured to make the auxiliary frame have a motion;

a sensing assembly, disposed at the body and configured to sense an operation area and output a sensing signal; and a controller, configured to, according to the sensing signal and a sensing threshold, control the driving assembly to make the auxiliary frame have the motion corresponding to the sensing signal, wherein the sensing assembly comprises a horizontal scanning sensor, the sensing threshold comprises a traveling feature, the horizontal scanning sensor is configured to horizontally scan the operation area and output a horizontal scanning signal, and when the horizontal scanning signal falls in the traveling feature, the controller controls the driving assembly to drive the auxiliary frame to move in a traveling direction.

11. The active rollator according to claim 10, wherein the sensing threshold comprises a turning feature, and when the horizontal scanning signal falls in the turning feature, the controller controls the driving assembly to drive the auxiliary frame to turn in a turning direction.

12. The active rollator according to claim 10, wherein the controller obtains a traveling speed according to the horizontal scanning signal, and controls the driving assembly to drive the auxiliary frame to move at the traveling speed in the traveling direction and drive the auxiliary frame according to the traveling speed to turn.

13. The active rollator according to claim 12, wherein the sensing assembly comprises a top sensor, the sensing threshold comprises a top distance area, the top sensor is configured to sense a top area and output a top signal, and when the top signal does not fall in the top distance area, the controller controls the driving assembly to stop the motion of the auxiliary frame.

14. The active rollator according to claim 12, wherein the sensing assembly comprises a vertical scanning sensor, the sensing threshold comprises a tipping feature, the vertical scanning sensor is configured to vertically scan the operation area and output a vertical scanning signal, and when the vertical scanning signal falls in the tipping feature, the controller controls the driving assembly to stop the motion of the auxiliary frame.

15. The active rollator according to claim 12, further comprising a gravity sensor, wherein the gravity sensor is configured to sense an inclination angle of the active rollator, and the controller adjusts a driving torque of the driving assembly according to the inclination angle.

16. The active rollator according to claim 12, wherein the driving assembly comprises a driving wheel, two driven wheels, a motor, and a driving circuit, and the controller controls the driving circuit to make the motor to drive the driving wheel to rotate and the rotating driving wheel enables the motion of the auxiliary frame.

17. The active rollator according to claim 12, wherein the driving assembly comprises two driving wheels, two driven wheels, two motors, and two driving circuits, and the controller controls the driving circuits to make the motors to separately drive the driving wheels to rotate and the rotating driving wheels enable the motion of the auxiliary frame.

* * * * *